Dec. 22, 1959 G. T. McCLURE ET AL 2,918,149
SLACK VARYING MEANS FOR USE WITH RAILWAY CAR TRUCK BRAKE BEAMS
Filed March 10, 1958 2 Sheets-Sheet 2
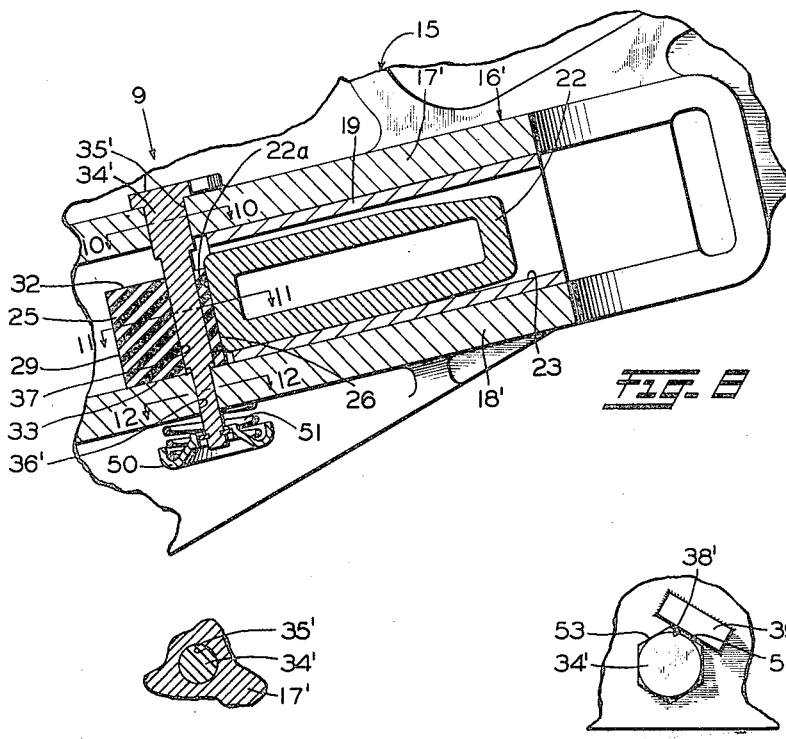
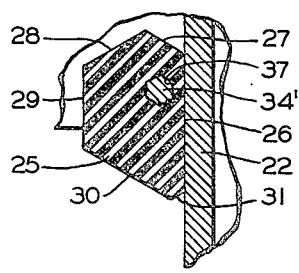
INVENTOR.
Thomas F. Hursen
Glenn T. McClure
BY
Adelbert A. Steinmiller
Attorney United States Patent Office 2,918,149
Patented Dec. 22, 1959

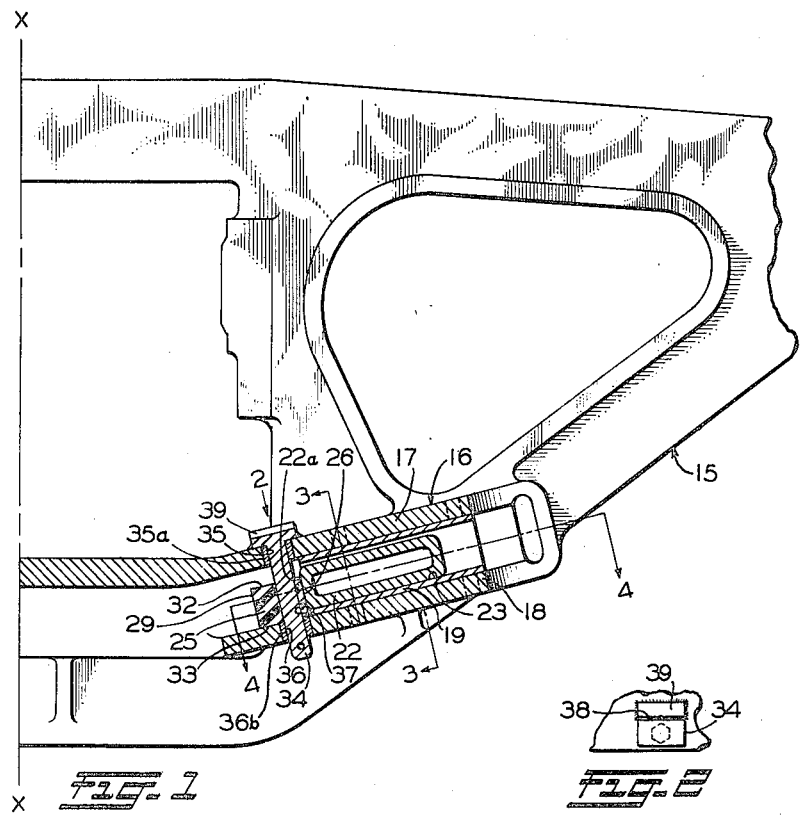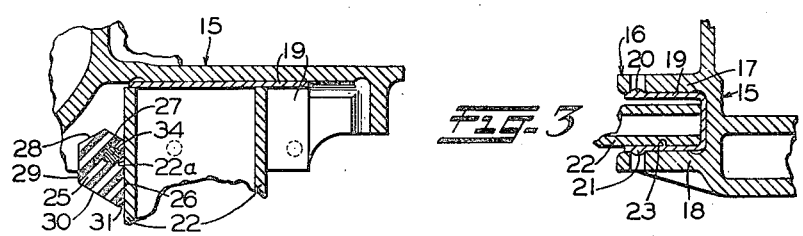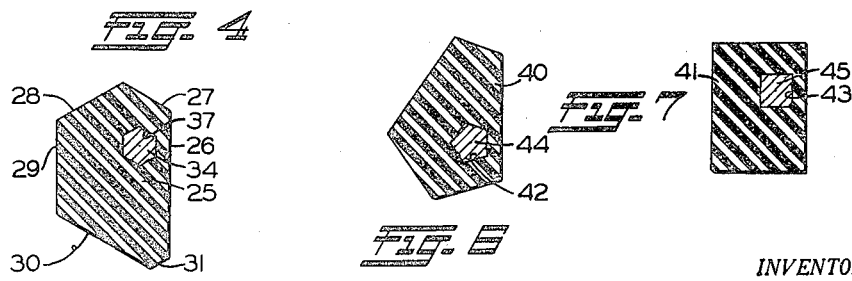

2,918,149

SLACK VARYING MEANS FOR USE WITH RAILWAY CAR TRUCK BRAKE BEAMS

Glenn T. McClure, McKeesport, and Thomas F. Hursen, Monroeville, Pa., assignors to Westinghouse Air Brake Company, Wilmerding, Pa., a corporation of Pennsylvania Application March 10, 1958, Serial No. 720,212

5 Claims. (Cl. 188—197)

This invention relates to brake rigging of the type used on railway cars and including truck brake beams, and more particularly relates to means for use with such brake rigging for varying the release position of the brake beams to correspondingly adjust slack clearance in the brake rigging.

It has previously been proposed to provide a brake rigging of the above general type comprising two generally parallel brake beams that extend transversely of a two-axle railway car truck and each of which adjacent its respective ends has guide foot portions having guided contact within inclined channels provided in guide supports formed integrally with or attached to the inboard sides of oppositely arranged truck side frames. It has recently been proposed to mount brake cylinder casings on one of the brake beams and rigidly connect the brake cylinder piston rods to the other brake beam, such that upon supply of fluid under pressure to the brake cylinders, the brake beams will move upwardly and outwardly from the truck center line and within the channels for carrying brake shoes associated with these brake beams into frictional braking engagement with a corresponding wheel of the truck.

In brake rigging of the above general type a stationary stop surface is formed integrally with the truck side frame at the lower end of the brake-beam-carrying channel for defining the release position of the brake beam. It will be apparent that as the brake shoes wear in service, such slack clearance will gradually increase to beyond a desired limit. When such clearance exceeds this desired limit, the brake cylinder piston rod must move an excessive distance to spread the longitudinally spaced brake beams sufficiently to effect a brake application. This is, of course, objectionable because excessive brake cylinder piston displacement will, by reason of the predetermined volumetric relationship between the auxiliary reservoir and brake cylinder, result in a reduced brake cylinder pressure for a given degree of brake pipe pressure reduction. With such brake rigging, a slack adjuster cannot be interposed between and connected by relatively extensible rods to the brake beams to extend one rod relative to the other and thus spread the brake beams gradually as the brake shoes wear. This is because the "heavier" brake beam (which carries the brake cylinder casings and is thus heavier than the other or "lighter" brake beam to which the brake cylinder piston rods are connected) can and would upon release of brakes always move downwardly within its channel until it engages the above-mentioned stationary stop surface; and hence, as the effective length of the rods is increased, the lighter brake beam would be forced during such brake release higher and higher up its inclined channel and thereby cause the brake shoes carried by the lighter brake beam to continuously ride on the corresponding wheels, thereby not only undesirably wearing these brake shoes but also undesirably increasing the tractive force required to haul such car.

It is therefore the principal object of this invention to provide an improved brake rigging of the above general type embodying means whereby slack clearance between the brake shoes and wheels may be periodically adjusted to within a desired limit, but operative in such manner that the "heavier" brake beam cannot force the brake shoes carried by the lighter brake beam into undesired engagement with the corresponding wheels when brakes are released.

According to the invention, there is provided, in an improved brake rigging of the above general type, novel positioning means for adjusting slack clearance between the brake shoes carried by the brake beams and the wheels to be braked, said means comprising at least one rotatable cam-like stop means of polygonal contour engageable by the heavier brake beam for defining a release or brake-shoe-disengaged position of both brake beams and pin means carried by the walls of the guide channel for the brake beams and passing eccentrically through and being locked to said cam-like means, such that different surfaces of said stop means at varying distances from the axis of said pin means may be presented, for engagement by said heavier brake beam according to the selected rotative position of said stop means for thus permitting variation of the release position of the brake beams and thereby permitting a corresponding variation in such slack clearance.

In the accompanying drawings, Fig. 1 is a fragmentary inboard sectional view of a truck side frame and one end of the heavier brake beam of a brake rigging, showing adjustable brake beam stop means constructed according to one embodiment of the invention for varying the release position of the heavier brake beam relative to the side frame, only one-half of the side frame being shown with the journal end of said side frame being broken away for sake of simplified showing, it being understood that the other half of said side frame, which carries one end of the lighter brake beam, is symmetrical relative to the central transverse plane X—X of said side frame except for the fact that it need not include said adjustable means;

Fig. 2 is a fragmentary, plan-like view taken in the direction of the arrow 2 of Fig. 1;

Fig. 3 is a fragmentary transverse sectional view taken along the line 3—3 of Fig. 1;

Fig. 4 is a fragmentary longitudinal sectional view taken along the line 4—4 of Fig. 1;

Fig. 5 is a cross-sectional view, to enlarged scale, of the preferred form of an adjustably positionable stop block shown in Fig. 1;

Figs. 6 and 7 are cross-sectional views, also to enlarged scale comparable to that of Fig. 5, showing alternate forms of an adjustably positionable stop block which may be used in lieu of that shown in Fig. 5;

Fig. 8 is a fragmentary inboard sectional view, corresponding to but of larger scale than the view of Fig. 1, of the relevant part of one-half of a modified truck side frame and one end of the heavier brake beam showing adjustable brake-beam stop means constructed according to another embodiment of the invention:

Fig. 9 is a fragmentary plan-like view taken in the direction of the arrow 9 of Fig. 8; and Figs. 10, 11 and 12 are fragmentary cross-sectional views taken along the lines 10—10, 11—11, and 12—12 of Fig. 8, respectively.

DESCRIPTION—FIGS. 1 THROUGH 7

In Fig. 1 of the drawings, there is shown part of one of a pair of side frames 15 for a railway car truck, each of which side frames has formed preferably integrally with its inboard side a pair of generally U-shaped brake beam guide supports 16 (only one of which is shown, the other being on the other substantially symmetrical part of the side frame which has not been shown). Each guide support 16 comprises an upper ledge 17 and a lower ledge 18 which are parallel and are inclined generally downward at a relatively small angle to the horizontal in the direction of the center line of the side frame 15; said ledges defining a channel which is thus open at its inboard end. An expandible U-shaped wear plate 19, which is disposed within the channel of each guide support, engages the adjacent surfaces of the ledges and has external beads, such as 20, 21 (Fig. 3) that are expanded into positioning openings or recesses provided in ledges 17, 18, respectively. There is provided a pair of brake beams 22, only the heavier one of which is shown, each of which extends transversely of the railway car and comprises adjacent its opposite ends so-called guide foot portions of hollow rectangular cross section which project into the channels provided in the corresponding wear plates of the oppositely arranged side frames 15. At its lower side the guide foot portion of each brake beam 22 has slidably guided contact with an inclined surface 23 of the wear plate 19 forming one side of the last-named channel; which surface is parallel to the ledges 17, 18; and the upper side of the brake beam is spaced with slight clearance from the wear plate to assure freedom of movement of the brake beam relative to the wear plate.

In addition to the two brake beams, such as 22, the guide foot portions of which project into and engage the wear plates in each truck side frame, brake rigging of the type generally described above and to which the present invention may be applied comprises a pair of brake cylinders (not shown) comprising casings each of which are mounted on and near the outer ends of the heavier one of the brake beams and also comprising a brake cylinder piston having a piston rod that extends lengthwise of the car and is connected to the lighter brake beam on which the casing is not mounted. Each brake beam 22, adjacent its ends which extend into the channels in the corresponding wear plates 19 of the oppositely arranged side frames 15, carries a brake head (not shown) to which is attached a brake shoe (not shown) which, upon upward spreading movement of the brake beams relative to their corresponding wear plates responsively to supply of fluid under pressure to the brake cylinder, will be carried radially into frictional braking engagement with a corresponding wheel (not shown) of a four-wheel truck.

According to the invention, when a brake application is released, the heavier of the brake beams 22 is adapted to slide downwardly along the wear plate surface 23 to a release position, in which it is shown, and which position is defined by contact of the lower upright side 22a of said brake beam with one of a plurality of flat sides of a rotatably adjustable stop block 25 that is of irregular polygonal cross section and preferably formed of hard rubber.

The stop block 25 preferably is of an irregular hexagonal cross section, as best shown in Fig. 5, presenting six flat sides 26 through 31 of differing widths joined to parallel upper and lower end surfaces 32, 33, respectively. This stop block is carried by a pin 34 having a shank of regular or equi-sided hexagonal cross section that passes slidably through aligned preferably regular hexagonal openings 35, 36 (to provide greater bearing area) preferably formed in bushings 35a, 36b inserted in corresponding bores through the ledges 17, 19 respectively; and intermediate its ends said shank passes slidably through a corresponding regular hexagonal opening 37 extending through said stop block. This hexagonal opening 37 is so disposed that the sides thereof and hence the respective hexagonal faces of the shank of pin 34 will be parallel to the sides 26 through 31 of the stop block 25; however, the opening 37 is arranged eccentrically in said block, such that the sides 26 through 31 are at successively greater distances from the axis of opening 37 and hence from the axis of pin 34. The pin 34 has an enlarged head of such, for example rectangular, cross section (Fig. 2) as to provide a long flat edge or face 38 that is disposed with very slight clearance adjacent a parallel flat face of a stop member 39 which is preferably welded to the upper surface of ledge 17; said stop member being engageable by the face 38 of the pin for constraining said pin and thereby said block against undesired rotation, inasmuch as said pin is rotatively connected with said block. This stop member 39 is preferably provided despite the fact that the openings 35, 36 in the bushings 35a, 36b are hexagonal, so as to assure against rotation of the bushings relative to the ledges 17, 18; if preferred, however, these bushings may be eliminated and hexagonal openings 35, 36 broached through said ledges, in which case the stop member 39 would not be required, inasmuch as rotation of the pin 34 relative to the ledges would be positively prevented.

If preferred, a stop block 40 (Fig. 6) having an irregular pentagonal cross section or a stop block 41 (Fig. 7) having a rectangular cross section may be used, in lieu of the stop block 25. In such event, these blocks 40, 41 would have five and four flat sides, respectively, of differing widths joined to parallel upper and lower end surfaces and having regular pentagonal and square through openings 42, 43, respectively, for accommodating corresponding pins 44, 45 having shanks of regular pentagonal or square cross section; said pins 44, 45, like pin 34, having enlarged heads providing flat edges engageable with stop member 39. As in the case of the stop block 25, when pin 44 or 45 is inserted into the corresponding opening 42 or 43, the respective flat faces of the shank of such pin will be parallel to the respective sides of the block with which it is associated; but the openings 42, 43 are arranged eccentrically relative to the respective block 40 or 41 such that the sides of the block will be at varying distances from the axis of the corresponding opening. It will be understood that the ledges 17, 18 will be provided with bushings similar to 35a, 36b inserted in bores (or if no bushings are used, then with openings) preferably of a configuration identical with that of the opening 42 or 43 according to whether block 40 or 41 is employed.

In operation, assume initially that the brake beams 22 are in a release position defined by contact of the lower upright side 22a of the heavier of said brake beams with the flat side 26 of block 25, which side is the nearest to the axis of pin 34. Under this condition, the brake beams will be in their lowermost release position, corresponding to a release position which is desired when the brake shoes (not shown) are new so as to provide proper slack clearance between said brake shoes and the wheels (not shown) to be braked.

As the brake shoes wear during service, it will be apparent that, when fluid under pressure is successively supplied to the aforementioned brake cylinders to spread the brake beams 22 and cause an application of brakes in the manner above explained, the brake beams 22 will have to ride progressively further upward relative to the corresponding wear plates 19 in order to effect frictional braking engagement of the associated brake shoes with the wheels to be braked; and hence, when the brake cylinders are vented and the brake beams 22 move downwardly toward each other to release positions defined by contact of the heavier of said brake beams with surface 26 of block 25 (or, in arrangements heretofore proposed, into contact with a fixed stop formed integrally with the side frame), the slack clearance between these brake shoes and wheels will gradually increase, for brake rigging of this general type is not provided with automatic or mechanical slack adjusters.

According to the invention, when this slack clearance thus tends to increase beyond a desired limit, the brake beams 22 are spread by a manually or mechanically applied force or by supply of fluid under pressure to the brake cylinders, then the pin 34 is raised to a point above the stop block 25, and the latter is then rotated clockwise sixty degrees, as viewed in Fig. 5, so that side 27 will face the lower upright side 22a of the heavier of the brake beams 22; whereupon the pin 34, which has not been rotated, is lowered so as to pass through the openings 37, 36 in the stop block and ledge 18, respectively, and the surface 38 of pin 34 may once again engage the stop member 39, if necessary, to positively prevent rotation of the pin and thereby of said stop block. If desired, a cotter pin (not shown) may be inserted through the lower end of the pin 34, which projects through opening 36, to prevent undesired raising of said pin. When such spreading force is released, the brake beams 22 will move downwardly until the side 22a of the heavier of said brake beams engages side 27 of the block, for thereby defining a new release position of the brake beams in which they are spread slightly further apart for thereby reducing the slack clearance to within the desired limit.

It will be apparent that during continued wear of the brake shoes and consequent increases in slack clearance, the stop block 25 may be rotated clockwise periodically in successive sixty-degree increments, in the manner just described, for correspondingly shifting the release position of the brake beams 22 upwardly relative to the corresponding wear plates 19, as required to maintain slack clearance within the desired limit. This successive shifting of the release position will occur because each of the sides 26 through 31 is at a successively greater distance from the fixed axis of pin 34.

It will be understood that if the stop block 40 or 41 is used, such blocks can be rotated counterclockwise and clockwise, respectively, (as viewed in Figs. 6 and 7) relative to pins 44, 45 through successive seventy-two degree and ninety degree increments for providing five and four slack reducing adjustments, respectively, of the release position of the associated brake beams.

DESCRIPTION—FIGS. 8 THROUGH 12

In the brake-beam-positioning means constructed according to this embodiment of the invention, parts identical with those shown in Figs. 1 through 7 are identified by like reference numerals and parts corresponding generally to those shown in said figures are designated by corresponding primed reference numerals.

According to this embodiment, a pin 34' comprises an enlarged hexagonal head (Fig. 9) which is joined to a shank comprising a cylindrical portion (Fig. 10) that is rotatable in a bore 35' through an upper ledge 17' and is joined to one end of another portion (Fig. 11) of reduced dimension and hexagonal cross section that passes through the hexagonal opening 37 in stop block 25, said other portion at the opposite end joining a cylindrical portion (Fig. 12) of further reduced diameter that is rotatable within a bore 36' and projects exteriorly of the lower side of ledge 18'. Adjacent its projecting end, this last-named cylindrical portion is adapted to accommodate a retaining ring against which a coaxially arranged annular dish-shaped spring seat 50 is pressed by a helical spring 51, which spring thus exerts a force on the pin 34' tending to maintain it in a lower position, in which it is shown, and which position is defined by contact of the hexagonal head with the upper side of ledge 17'. A stop member 39' welded or otherwise secured to the upper side of ledge 17' is disposed at an angle of thirty degrees to the line of extension of said ledge and with slight clearance adjacent the hexagonal head of pin 34' such that any one of the hexagonal sides, such as side 52, of said head may, according to the selected rotative position of the pin 34', engage said stop member and thereby constrain said pin and thereby the stop block 25 against undesired rotation.

In operation, assume initially that following installation of new brake shoes, each stop block 25 (near each end of the heavier of the brake beams 22) has been rotated to a position in which it is shown in Figs. 8, 9, 11 and in which its side 26 faces the heavier brake beam, and that brakes are released. Under this condition, both of the brake beams will be in lowermost release position, in which side 26 engages the lower upright side 22a of the heavier of the brake beams, to provide proper slack clearance for the new brake shoe.

When this slack clearance has increased to beyond or almost beyond the desired limit due to wear of the brake shoes during successive brake applications, the pin 34' is manually or mechanically raised against resistance of spring 51 so as to lift the hexagonal head of said pin above the stop 39', and said pin is then rotated clockwise sixty degrees for thereby correspondingly rotating the stop block 25 to a position in which the side 27 of said stop block will engage the lower upright face 22a of the heavier of the brake beams 22 to define a new release position of the brake beams in which slack clearance has been reduced to within the desired limit; whereupon force is released from the pin 34' for permitting it to be pulled downwardly by spring 51, such that a side 53 of said hexagonal head will be disposed adjacent the stop member 39' and through engagement therewith constrain the pin and thereby said stop block against undesired rotation.

During successive brake applications the slack clearance will again increase due to brake shoe wear, and as such clearance tends to exceed the desired limit, the pin 34' and thereby the stop block 25 may be periodically rotated in successive sixty-degree increments to correspondingly adjust the release position of the brake beams 22, as required to maintain slack clearance within the desired limit, as will be understood from preceding description in connection with Figs. 1 through 7.

It will be understood that, if desired, the stop block 40 (Fig. 6) or the stop block 41 (Fig. 7) may be used, in lieu of a stop block 25, in which case the pins for such stop blocks would be like the pin 34' except that the hexagonal portions of pin 34' would be replaced by regular pentagonal and square portions, respectively, and the position of the stop member 39' modified accordingly.

It will also be apparent that, if desired, a stop block (not shown) may be used having a continuous cam surface increasingly eccentric relative to the axis of a pin-accommodating non-circular through opening. Also, the pin may, if desired, have splined connection with the stop block, although the types of connection hereinabove described are preferable to assure that respective sides of the stop block will always be precisely parallel to the lower upright side 22a of the heavier brake beam.

Summary

It will thus be seen that an improved brake rigging for railway cars has been provided embodying operator-adjustable means for varying the release position of the brake beams so as to thereby enable slack clearance between the respective brake beams and their associated brake shoes to be periodically reduced to within a desired limit as the brake shoes wear during service. With this improved brake apparatus, means are thus provided for desirably preventing excessive displacement of the brake cylinder piston during brake applications; said means being operative in such manner as to prevent the "heavier" brake beam (which carries the brake cylinder casings) from forcing the brake shoes on the "lighter" brake beam to which the brake cylinder piston rods are connected to ride against the wheels while brakes are released.

Having now described the invention, what we claim as new and desire to secure by Letters Patent, is:

1. Positioning means for adjusting slack clearance between a brake shoe and wheel by varying the release position of a brake-shoe-carrying brake beam that extends transversely of a railway car and adjacent each of its ends has guided engagement within a channel that is provided at the inboard side of a truck side frame and is inclined downwardly toward the center line of said frame and which brake beam is movable upwardly within said channel and in a direction away from said center line for effecting frictional braking engagement of the brake shoe with the wheel, said positioning means comprising cam-like stop means rotatably disposed within and near the lower end of the channel and engageable by the lower upright side of the brake beam for defining the release position of the latter, and a pin means carried by the walls of the channel and intermediate its ends passing eccentrically through and being rotatively connected to said stop means, such that surfaces of said stop means at varying distances from the axis of said pin means may be presented for engagement by said lower upright side of the brake beam according to the selected rotative position of said stop means for thereby permitting variation of the release position of the brake beam.

2. The combination according to claim 1, including interlockingly engageable means associated with said pin means and the truck side frame in proximity of the channel for normally constraining said pin and thereby said stop means against rotation relative to the channel, the last-named means being disengageable for permitting rotation of said stop means.

3. Means for adjusting slack clearance between a brake shoe and wheel by varying the release position of a brake-shoe-carrying brake beam that extends transversely of a railway car and adjacent each of its ends has guided engagement within a channel that is provided at the inboard side of a truck side frame and is inclined downwardly toward the center line of said frame and which brake beam is movable upwardly within said channel and in a direction away from said center line for effecting frictional braking engagement of the brake shoe with such wheel, said means comprising stop means of irregular polygonal cross section rotatably disposed within and near the lower end of the channel such that a selectable one of a plurality of sides of such polygon may be rotatably presented for engagement by the brake beam for defining the release position of the latter, and a pin normally supported by and passing transversely through the walls of the channel and intermediate its ends having a portion with a cross section in the form of a regular polygon having faces equal in number to and parallel to the respective sides of said stop means, which portion extends into a correspondingly shaped opening that extends eccentrically through said stop means such that said sides of the stop means are disposed at varying distances from said polygonal faces of said portion, said pin by virtue of the polygonal cross section of said portion and opening being rotatively connected to said stop means, whereby such release position of the brake beam will be varied according to which of the respective sides of said stop means is rotatively positioned for engagement by the brake beam.

4. Means for adjusting slack clearance between a brake shoe and wheel by varying the release position of a brake-shoe-carrying brake beam that extends transversely of a railway car and adjacent each of its ends has guided engagement within a channel that is provided at the inboard side of a truck side frame and is inclined downwardly toward the center line of said frame and which brake beam is movable upwardly within said channel and in a direction away from said center line for effecting frictional braking engagement of the brake shoe with such wheel, said means comprising stop means of irregular polygonal cross section rotatably disposed within and near the lower end of the channel such that a selectable one of a plurality of sides of such polygon may be rotatably presented for engagement by the brake beam for defining the release position of the latter, a pin normally supported by and passing transversely through the walls of the channel and intermediate its ends having a portion with a cross section in the form of a regular polygon having faces equal in number to and parallel to the respective sides of said stop means, which portion extends into a correspondingly shaped opening that extends eccentrically through said stop means such that said sides of the stop means are disposed at varying distances from said polygonal faces of said portion, said pin by virtue of the polygonal cross section of said portion and opening being rotatively connected to said stop means, and means for normally constraining said pin and thereby said stop means against rotation relative to the channel for locking said stop means in any selected rotative position, the last-named means being capable of being rendered ineffective for permitting rotation of said stop means, whereby such release position of the brake beam will be varied according to which of the respective sides of said stop means is rotatably positioned for engagement by the brake beam.

5. Positioning mechanism for adjusting slack clearance between a braking element and braking surface on a wheel by varying the release position of a brake beam that is operatively connected to the braking element and is movable in a direction away from the transverse center line of a railway car truck in slidably guided contact at its opposite ends with respective guide surfaces provided on respective means connected to the inboard sides of respective side frames of the truck, for thereby operatively effecting frictional braking engagement of the braking element with the braking surface, said positioning mechanism comprising cam-like stop means rotatably disposed above and near the center-line-adjacent end of at least one of said guide surfaces and engageable by the center-line-facing side of the brake beam for defining the release position of the latter, and a pin means for each stop means carried by the corresponding guide-surface-providing means and intermediate its ends passing eccentrically through and being rotatively connected to such stop means, such that surfaces of said stop means at varying distances from the axis of said pin means may be presented for engagement by said center-line-facing side of the brake beam according to the selected rotative position of such stop means for thereby permitting variation of the release position of the brake beam.

References Cited in the file of this patent
UNITED STATES PATENTS

| | | |
|---|---|---|
| 457,544 | Dobbel | Aug. 11, 1891 |
| 1,870,296 | Schnell | Aug. 9, 1932 |
| 2,423,015 | Goepfrich et al. | June 24, 1947 |